Jan. 11, 1938.    W. D. DODENHOFF    2,104,832
PICKER FOR LOOMS
Filed March 6, 1937
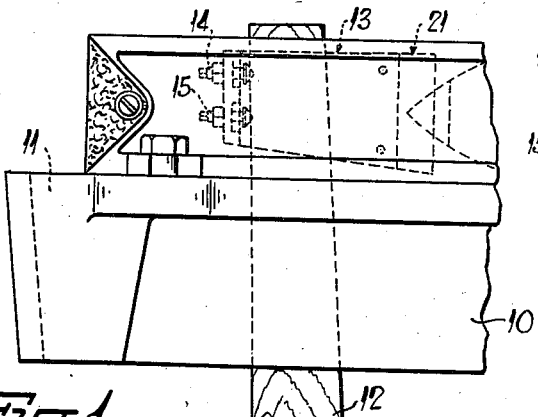
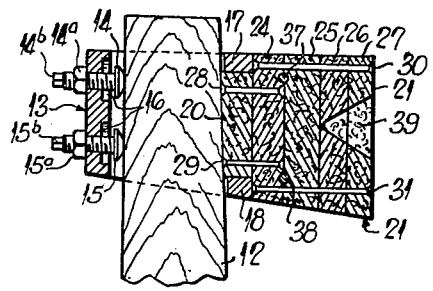
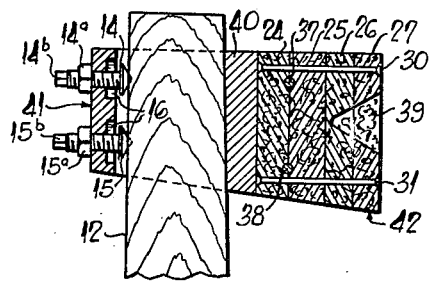
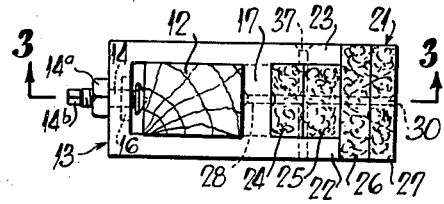
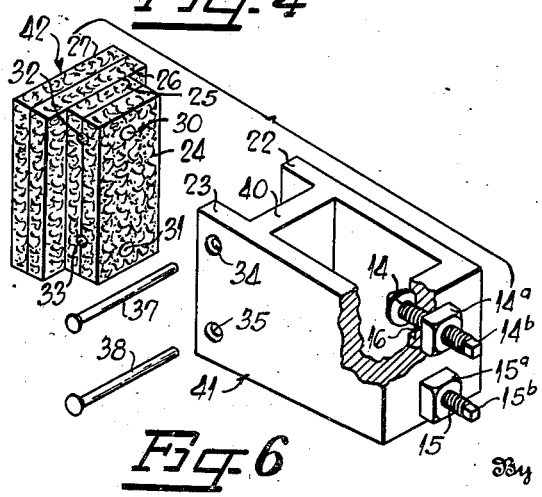
WILLIAM D. DODENHOFF
Inventor
Attorney

UNITED STATES PATENT OFFICE 2,104,832

PICKER FOR LOOMS

William D. Dodenhoff, Greenville, S. C.

Application March 6, 1937, Serial No. 129,432

5 Claims. (Cl. 139—159)

This invention relates to a picker for looms and more especially to a picker having a metallic casing provided with a cavity for the reception of the upper end of a picker stick and a bifurcated portion at its front edge for the reception of an impact receiving filler. Heretofore, many conventional pickers were made entirely out of leather and the continuous use of these pickers ultimately caused the same to become distorted and bulged at its forward end.

It has also been a problem to properly adjust and aline these pickers on picker sticks. The ordinary picker stick is smallest in cross-section at its upper end and gradually tapers outwardly as the stick progresses downwardly. This taper is provided so that the leather picker might be pushed downwardly onto the picker stick until the same has been wedged into position. Since modern looms are designed to propel the shuttle from one side to the other, at the rate of perhaps 150 to 250 picks per minute, it is quite evident that these rapid impacts will cause the picker to not only bulge but also will cause it to be thrown out of alinement.

It is therefore, an object of this invention to provide a picker for looms comprising a metallic casing having a receptacle in the forward end thereof in which a leather filler is inserted and also having a cavity in the other portion of the casing for the reception of the picker stick, with means in said second cavity for properly positioning and alining the casing with relation to the picker stick. This alining means, in the present instance, comprises a pair of special made screws threadably secured in the back wall of the casing and having the inside head portions thereof conically-shaped and normally engaging the back side of the picker stick. The combined action of these two screws not only secures the casing upon the picker stick in its proper position, but also serves as an alining means in case the forward end of the casing should become too high or too low. In such a case, it is only necessary to apply more pressure upon one screw than upon the other to force the forward end of the casing into alined position.

It is a further object of this invention to provide a metallic casing of the class described with alining means disposed in the back wall of the picker casing which normally engages the picker stick, said picker casing having in its forward wall a suitable opening into which the one edge of an impact receiving filler is adapted to project so that the rear edge of this filler will contact the forward edge of the picker stick thereby causing the alining screws to press the picker stick into contact with the impact receiving member. Since the impact receiving member is made of resilient material such as leather, it is quite evident that the frictional contact between the forward edge of the picker stick and the edge of the filler will tend to hold the casing in proper position and also allow the impact of the shuttle to be transmitted to the upper edge of the picker stick. All of these items will serve to relieve the picker shell of the sudden impact and give a certain amount of resiliency and shock absorbing qualities when the impact member contacts the end of the shuttle.

Some of the objects of the invention having been stated, other objects will appear as the description proceeds when taken in connection with the accompanying drawing, in which:—

Figure 1 is an elevation of one end of the lay of the loom showing a picker stick mounted therein with my invention secured thereon;

Figure 2 is a top plan view of a picker stick with the invention secured thereon;

Figure 3 is a vertical sectional view taken along line 3—3 in Figure 2;

Figure 4 is an isometric exploded view of my improved picker;

Figure 5 is a vertical sectional view similar to Figure 3 but showing a slightly modified form of the invention;

Figure 6 is an isometric exploded view of the form of the invention shown in Figure 5.

Referring more specifically to the drawing, the numeral 10 indicates a portion of the lay of a loom which has a slot 11 therein in which is adapted to oscillate a picker stick 12, said picker stick 12 having a metallic casing 13 secured on the upper end thereof by means of adjusting bolts 14 and 15.

The back wall of the picker shell has cavities 16 therein, into which the heads of set bolts 14 and 15 are allowed to recede prior to inserting the casing over the picker stick. The front wall of the picker shell 13 comprises bars or cross pieces 17 and 18 thereby providing an opening 19 therebetween which accommodates layer 20 of the impact receiving member 21. The front edge of the picker shell also has bifurcated sidewalls 22 and 23 between which layers of leather 24 and 25 are adapted to fit. Two additional layers 26 and 27 of any suitable impact receiving material are adapted to cover the front edge of the picker shell including the front edge of bifurcated sidewalls 22 and 23. This design provides an impact receiving member whose forward face entirely covers the front side of a metallic picker. The layers 20, 24, 25, 26, and 27 are secured together by any suitable means such as rivets 28 and 29, 30 and 31, and the combined layers have suitable transverse holes 32 and 33 therethrough which are adapted to coincide with holes 34 and 35 in bifurcated sidewalls 22 and 23 when the filler is in position within the casing. Then suitable pins 37 and 38 are adapted to be inserted in these holes to secure the filler in position within the shell.

When the set bolts 14 and 15 are screwed into engaging position with the back side of the picker stick 12, (Fig. 3), the front upper edge of the picker stick normally engages the back layer 20 of impact receiving member 21 thereby providing a direct resilient medium whereby the impact of the shuttle as it engages cavity 39 in the forward end of the picker 20, will be transmitted to the top, front edge of the picker stick 12.

Much trouble has been experienced heretofore, in alining the forward edge of the picker especially where metallic casings have been used. This trouble is mainly due to the fact that picker sticks are usually made of wood and an exact uniformity in size cannot be easily produced since some types of wood are subject to more shrinkage than others. Also, the moisture content of the picker sticks when they are manufactured varies thereby causing a variable finished product.

In the present instance, should the forward end of the picker become too high it is necessary to screw the set bolt 15 inwardly whereas, if it becomes too low it is necessary to screw the bolt, that is the upper set bolt 14, inwardly. The combined actions of the two bolts will tilt the forward end downwardly or upwardly as desired. The set screws 14 and 15 have lock nuts 14a and 15a respectively, which hold the screws in the desired position. These set screws also have squared ends 14b and 15b respectively, which may be engaged by a suitable wrench to operate the screws.

Figures 5 and 6 show a slightly modified form wherein like reference characters will be used to denote similar parts and only the differences will be described.

The principal difference in this form is that the forward wall 40 of the picker shell 41 is continuous from top to bottom thereby eliminating the cavity 19. This will likewise eliminate the layer 20 which will leave layers 24, 25, 26, and 27 in the modified impact receiving member 42.

In the drawing and specification, there has been set forth a preferred embodiment of the invention, and although specific terms are employed, they are used in a generic and descriptive sense only, and not for purposes of limitation, the scope of the invention being set forth in the appended claims.

I claim:
1. A picker for looms having a metallic shell provided with a squared cavity for receiving the upper end of the picker stick of a loom and having a pair of spaced vertically disposed projections on its forward edge and having a hole in the forward wall of the said metallic shell, a leather member adapted to fit between said projections and having a forward layer broader than the other layers to overlap the forward edges of said projections and also having a rear layer for fitting in said hole in said forward wall and means for securing said leather member in position between said projections.

2. A picker for looms having a metallic shell provided with a squared cavity for receiving the upper end of the picker stick of a loom and having a pair of spaced vertically disposed projections on its forward edge and having a hole in the forward wall of the said metallic shell, a leather member adapted to fit between said projections and having a forward layer broader than the other layers to overlap the forward edges of said projections and means for securing said leather member in position between said projections, the rear inner surface of said squared cavity having a pair of cavities therein, and each cavity having a hole communicating with the bottom of the cavity and the rear surface of the metallic shell, and a bolt threadably mounted in each hole and having a blunt forward end adapted to engage and pinch the rear edge of the picker stick to hold the shell on the picker stick.

3. A picker for the picker sticks of looms comprising a shell having a vertically disposed square hole therethrough and having a pair of spaced vertically disposed and forwardly projecting portions, a leather member secured between said projecting portions and completely covering the forward edges of said projections, the forward wall of said shell having a hole therethrough and said leather member having a projection adapted to fit into said hole and contact a picker stick disposed in said squared hole, and the rear wall of said squared hole having a pair of bolts threadably penetrating the same for engaging the rear surface of the picker stick to hold the shell thereon.

4. A picker for loom picker sticks comprising a metallic shell having means for holding a leather impact receiving portion and having a squared hole therein for reception of the upper end of the picker stick, the rear wall of said shell having a pair of bolts threadably penetrating the same and having enlarged heads thereon for engaging the rear surface of the picker stick, the inner surface of said shell having cavities therein surrounding said holes and into which said heads are adapted to be positioned while the shell is being installed on the picker stick, said bolts when advanced being adapted to engage and hold the picker in the desired adjusted angular position with relation to the picker stick.

5. A picker for looms having a metallic shell provided with a squared cavity for receiving the upper end of the picker stick of a loom and having a pair of spaced vertically disposed projections on its forward edge and having a hole in the forward wall of the said metallic shell, a fibrous member adapted to fit between said projections and having a forward layer broader than the other layers to overlap the forward edges of said projections and means for securing said fibrous member in position between said projections, the rear wall of said squared cavity having a pair of threaded holes therein and a bolt threadably mounted in each hole and having a forward end adapted to engage and pinch the rear edge of the picker stick to hold the shell on the picker stick in adjusted position.

WILLIAM D. DODENHOFF.